(12) United States Patent
Heo et al.

(10) Patent No.: US 7,719,161 B2
(45) Date of Patent: May 18, 2010

(54) METHOD OF DESIGNING ROTARY THERMAL ACTUATOR AND ROTARY THERMAL ACTUATOR

(75) Inventors: Seok Heo, Incheon (KR); Yoon Young Kim, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 497 days.

(21) Appl. No.: 11/822,340

(22) Filed: Jul. 5, 2007

(65) Prior Publication Data

US 2008/0073997 A1 Mar. 27, 2008

(30) Foreign Application Priority Data

Sep. 25, 2006 (KR) ...................... 10-2006-0093070

(51) Int. Cl.
*H02N 10/00* (2006.01)
(52) U.S. Cl. ....................................... 310/306
(58) Field of Classification Search ................. 310/306, 310/309; 359/196, 217; 60/528
See application file for complete search history.

(56) References Cited

U.S. PATENT DOCUMENTS 5,303,080 A * 4/1994 O'Brien et al. .......... 359/196.1
5,383,168 A * 1/1995 O'Brien et al. .......... 369/44.14
6,137,206 A 10/2000 Hill
6,211,599 B1 * 4/2001 Barnes et al. ................ 310/309
6,313,562 B1 * 11/2001 Barnes et al. ................ 310/306
6,960,849 B1 * 11/2005 Klody et al. .......... 310/40 MM

OTHER PUBLICATIONS

Kyung Joo Kim, "Software Development for the Integrated Design of the MEMS Actuators." Dec. 31, 2002. (English Abstract Included).

* cited by examiner

*Primary Examiner*—Mark Budd
(74) *Attorney, Agent, or Firm*—The Nath Law Group; Jerald L. Meyer; Derek Richmond

(57) ABSTRACT

Provided are a method of designing a rotary thermal actuator and a rotary thermal actuator. The method includes setting the shape of an entire design domain; dividing the entire design domain into a predetermined number of domains which are symmetrical to one another in a rotational direction from the center of the entire design domain; designing the domains using a topology optimization method which uses a driving stage disposed at the center of the entire design domain, an initial shape of thermal expansion members which connect electrodes disposed at outer boundaries of the entire design domain, material properties of the thermal expansion members, and boundary conditions of the domains; and designing the entire design domain such that the designed domains are symmetrical to one another in the rotational direction.

11 Claims, 14 Drawing Sheets

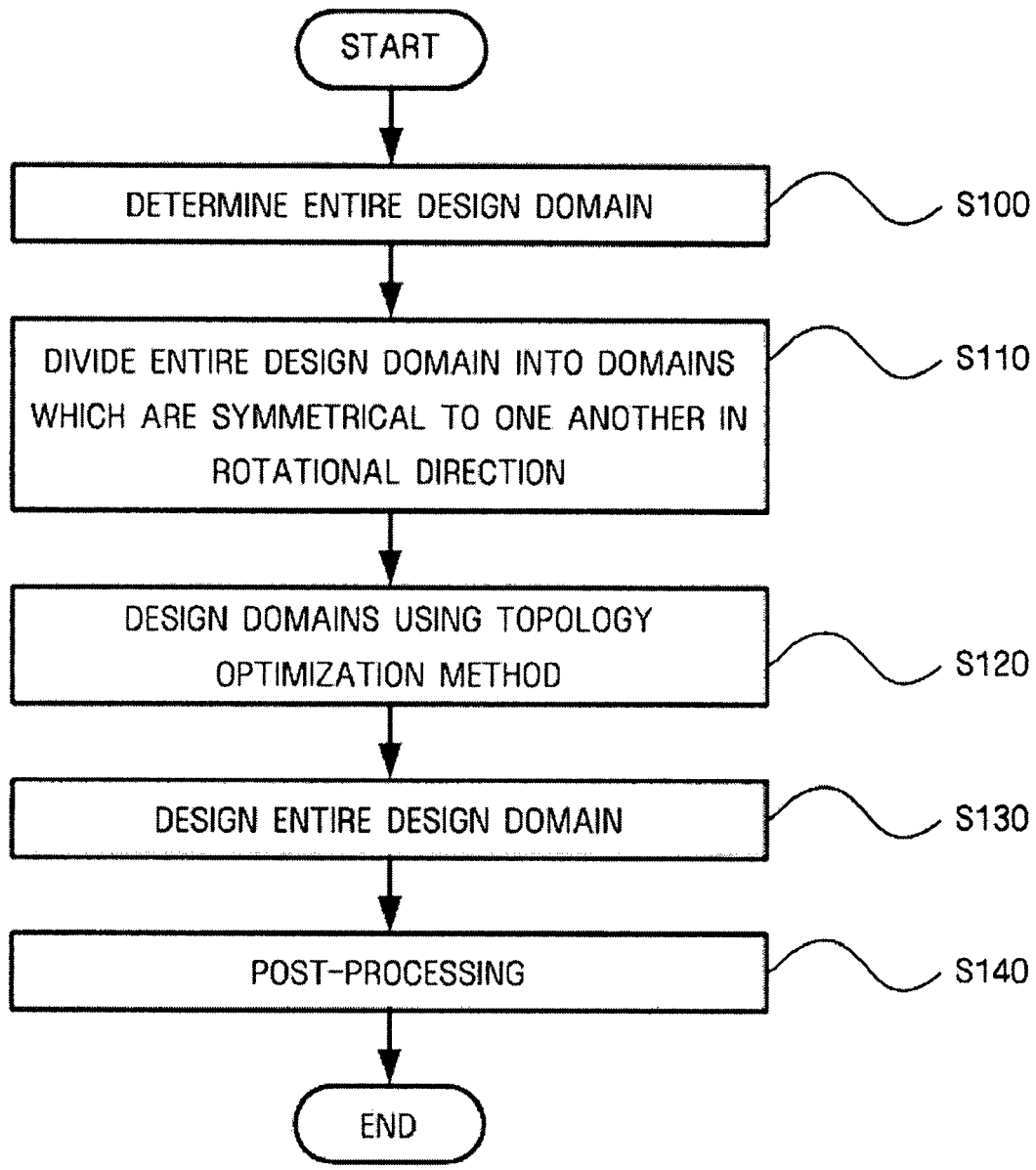

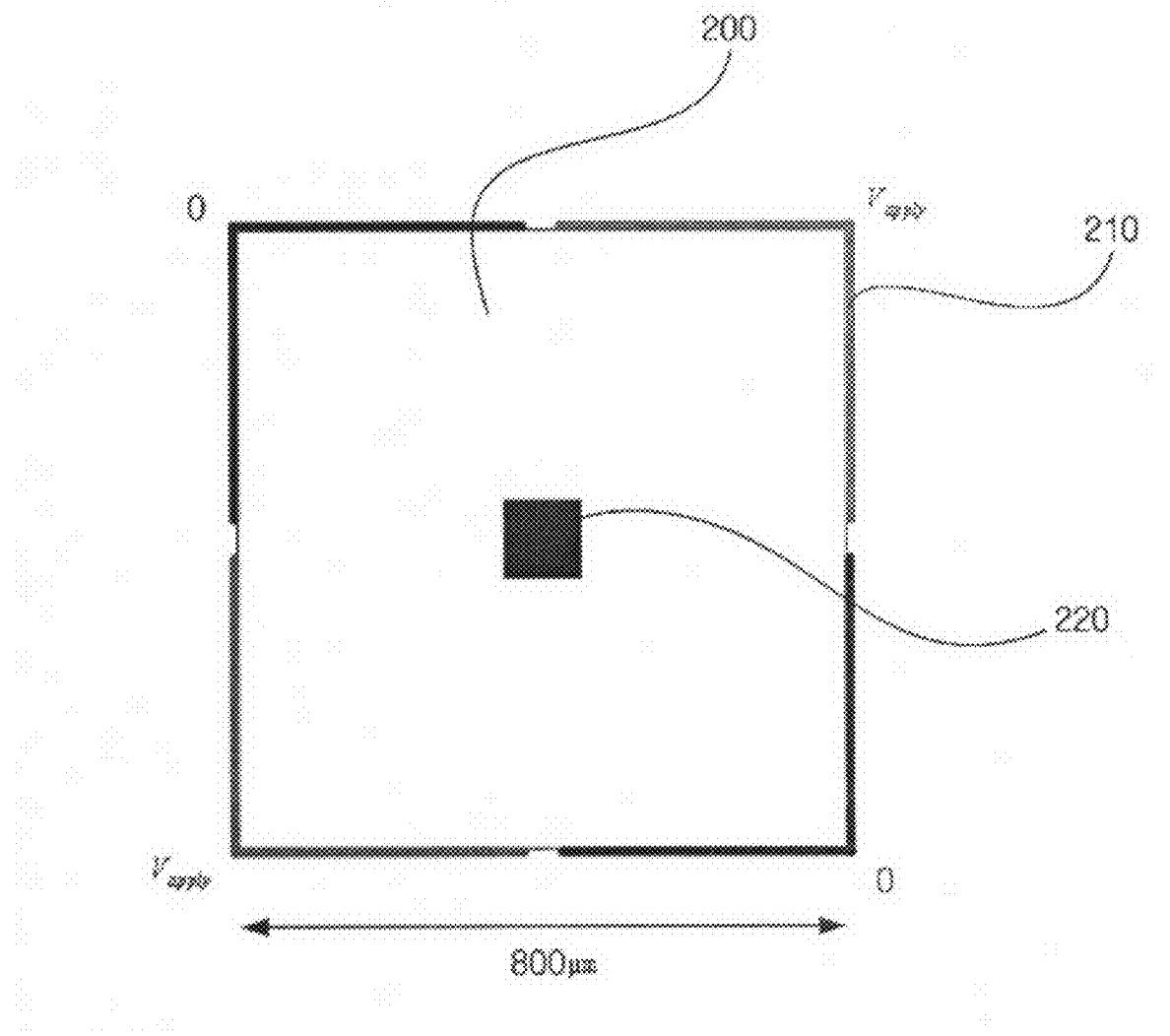

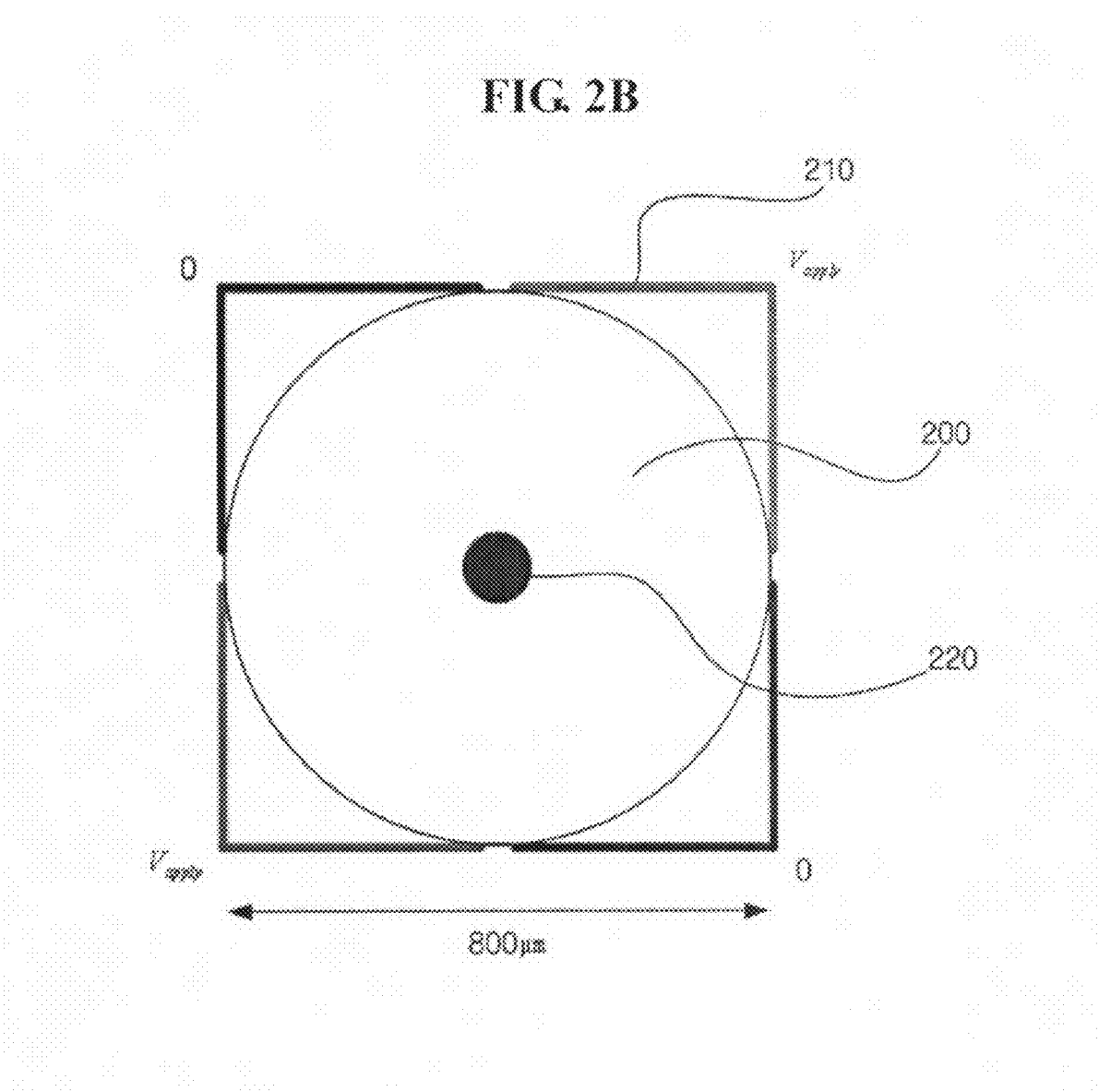

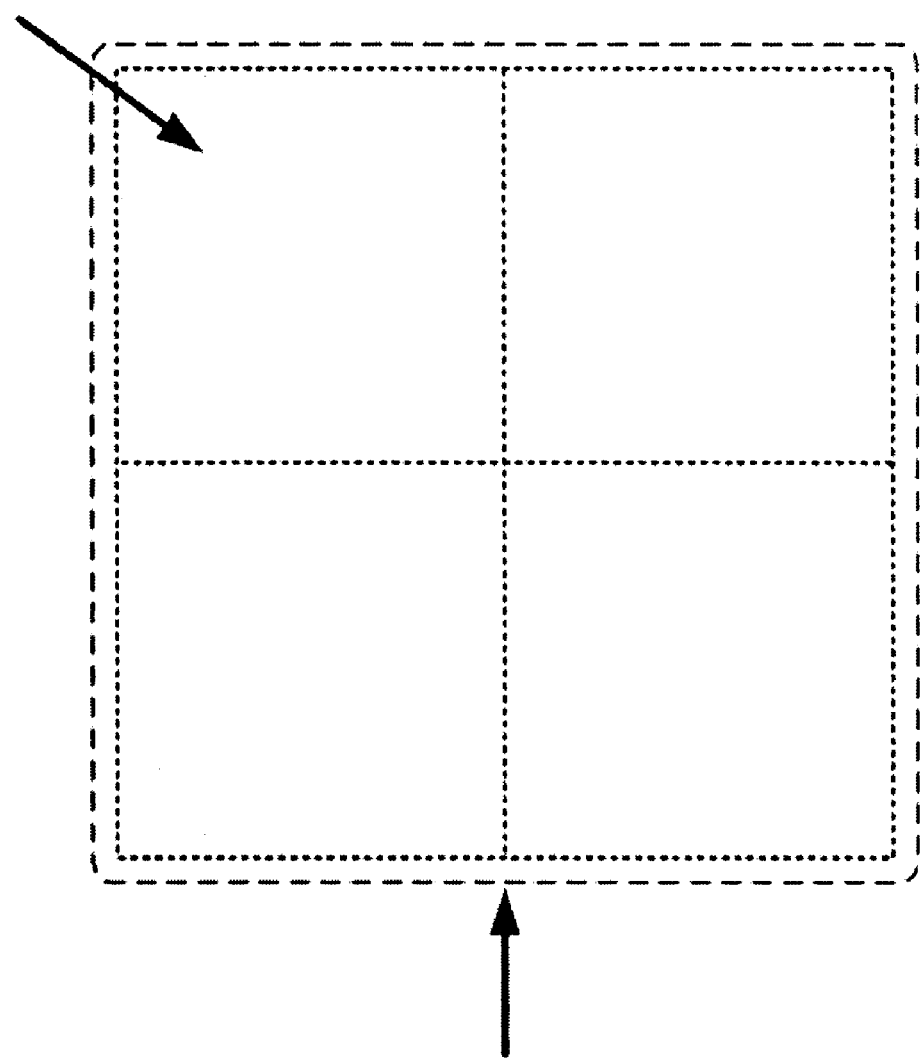

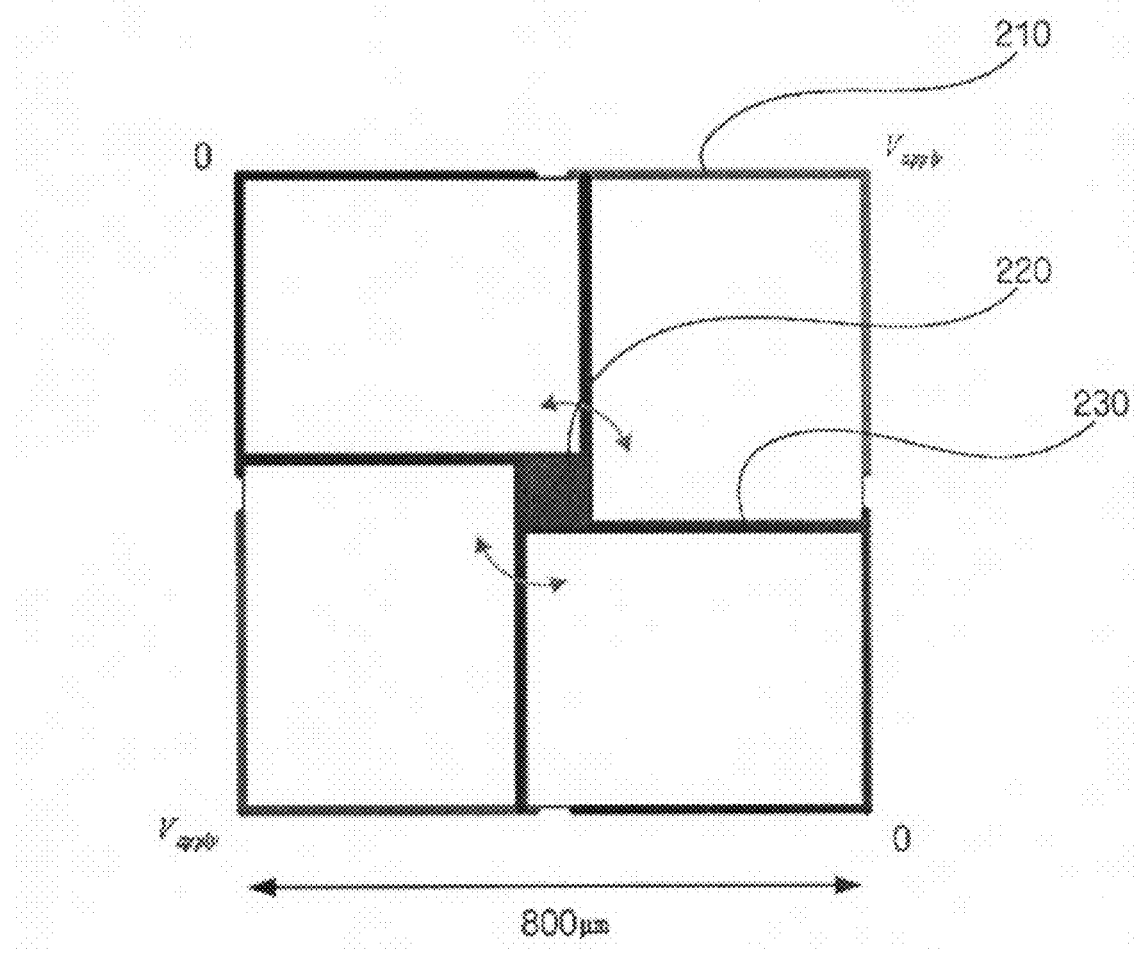

FIG. 6C
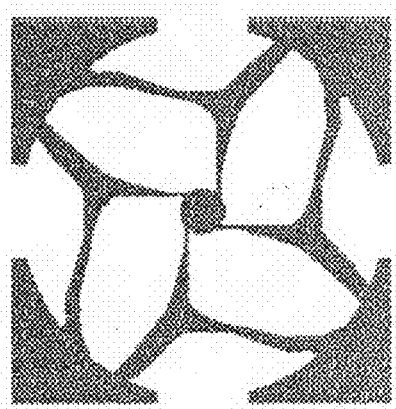
FIG. 7B
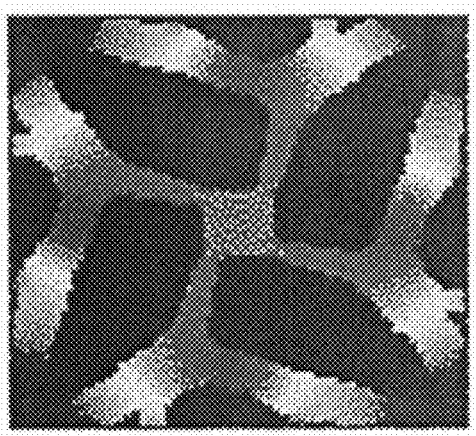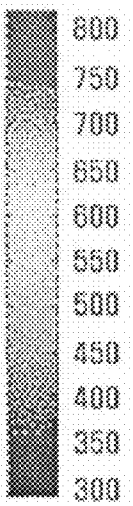
FIG. 7C
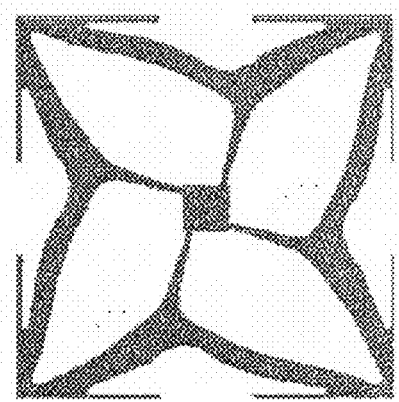

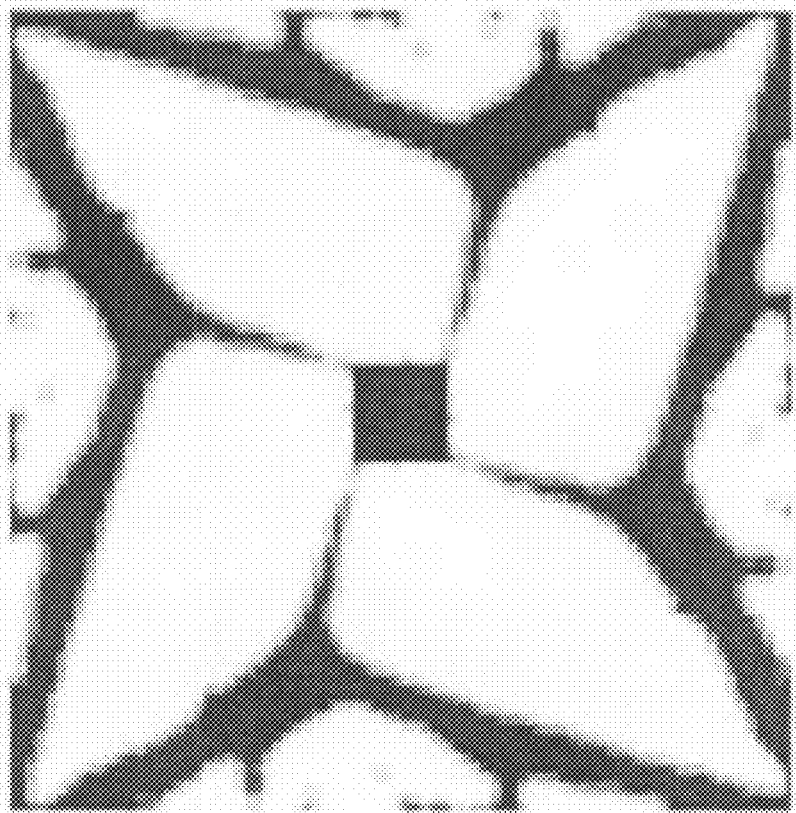

METHOD OF DESIGNING ROTARY THERMAL ACTUATOR AND ROTARY THERMAL ACTUATOR

This application claims priority from Korean Patent Application No. 10-2006-0093070 filed on Sep. 25, 2006 in the Korean Intellectual Property Office, the disclosure of which is incorporated herein by reference in its entirety.

BACKGROUND OF THE INVENTION

1. Field of the Invention

The present invention relates to a method of designing a rotary thermal actuator and a rotary thermal actuator, and more particularly, to a rotary thermal actuator and a method of designing a rotary thermal actuator, which has superior rotation performance and used in a micro-electromechanical system (MEMS) structure, through topology optimization design using an element connectivity parameterization method.

2. Description of the Related Art

Various methods of driving micro-electromechanical system (MEMS) apparatuses, such as a driving method using electrostatic force and a driving method using thermal expansion, have been developed. In particular, comb drive actuators using electrostatic force have a short response time due to the properties of electrostatic force and are easy to design. Therefore, the comb drive actuators are widely used to make horizontal, vertical, and rotational motions.

However, the force of the comb drive actuators using electrostatic force is relatively weak compared with the size thereof. Therefore, a larger actuator and a higher driving voltage are required in order to obtain greater force. In particular, MEMS apparatuses for optical communication require very large comb drive actuators that can drive relatively large and heavy mirrors.

On the other hand, thermal actuators using thermal expansion caused by electric energy are easy to manufacture and have relatively stronger force. Therefore, the thermal actuators can replace the comb drive actuators using electrostatic force.

However, while it is possible to make linear motions using the thermal actuators, it is difficult to make rotational motions. Accordingly, topology optimization researches of various forms for thermal actuators have been studied. However, the major portion of them is for simple to-and-fro motions, and driving, such as rotational motions, has not been specifically designed.

SUMMARY OF THE INVENTION

The present invention provides a rotary thermal actuator having a micro-electromechanical system (MEMS) structure which has relatively strong force when driven at a low voltage.

However, the objectives of the present invention are not restricted to the one set forth herein. The above and other objectives of the present invention will become more apparent to one of daily skill in the art to which the present invention pertains by referencing a detailed description of the present invention given below.

According to an aspect of the present invention, there is provided a method of designing a rotary thermal actuator. The method includes setting the shape of an entire design domain; dividing the entire design domain into a predetermined number of domains which are symmetrical to one another in a rotational direction from the center of the entire design domain; designing the domains using a topology optimization method which uses a driving stage disposed at the center of the entire design domain, an initial shape of thermal expansion members which connect electrodes disposed at outer boundaries of the entire design domain, material properties of the thermal expansion members, and boundary conditions of the domains; and designing the entire design domain such that the designed domains are symmetrical to one another in the rotational direction.

According to another aspect of the present invention, there is provided a rotary thermal actuator including thermal expansion members thermally expanded by thermal energy; energy sources supplying energy to the thermal expansion members; and a driving stage connected to the thermal expansion members and rotated by thermal expansion of the thermal expansion members, wherein the shape of the thermal expansion members are designed using the method of designing a rotary thermal actuator.

BRIEF DESCRIPTION OF THE DRAWINGS

The above and other features and advantages of the present invention will become more apparent by describing in detail preferred embodiments thereof with reference to the attached drawings in which:

FIG. 1 is a flowchart illustrating a method of designing a rotary thermal actuator according to an embodiment of the present invention;

FIG. 2A illustrates an entire design domain of a square shape according to an embodiment of the present invention;

FIG. 2B illustrates an entire design domain of a round shape according to an embodiment of the present invention;

FIGS. 3A and 3B illustrate an entire design domain divided into domains which are symmetrical to one another in a rotational direction from the center of the entire design domain according to an embodiment of the present invention;

FIG. 4 illustrates an intuitively designed rotary thermal actuator according to an embodiment of the present invention;

FIGS. 6A through 6C illustrate the density distribution, temperature distribution, and post-processing result of a rotary thermal actuator having a round entire design domain unlike the entire design domain illustrated in FIG. 5 and on which topology optimization is performed according to an embodiment of the present invention;

FIGS. 7A through 7C illustrate the density distribution, temperature distribution, and post-processing result of a rotary thermal actuator having an entire design domain divided into four domains as illustrated in FIG. 3B, an initial shape of thermal expansion members identical to the initial shape illustrated in FIG. 5A, and on which topology optimization is performed according to an embodiment of the present invention;

DETAILED DESCRIPTION OF THE INVENTION

Figure 3B:
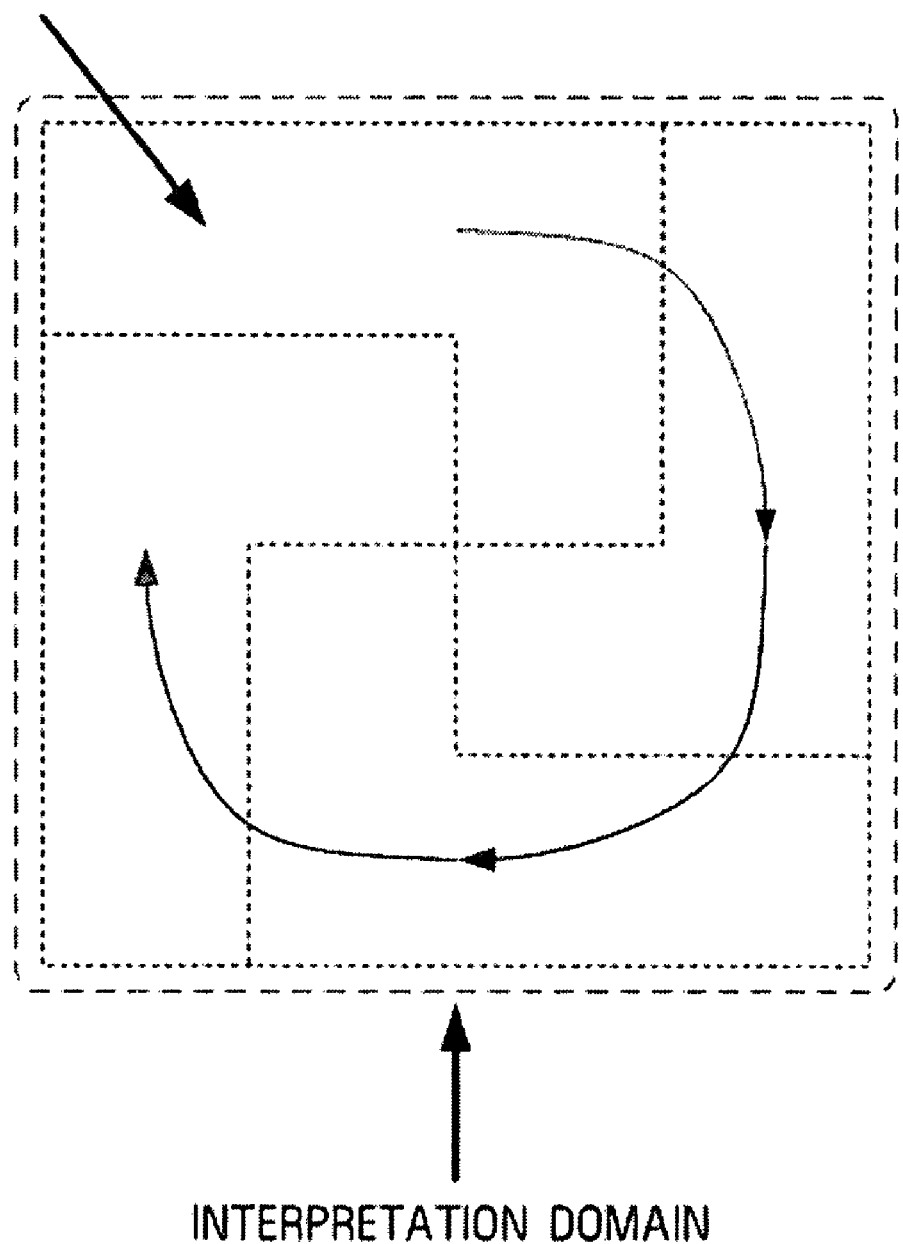

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

A method of designing a rotary thermal actuator and a rotary thermal actuator according to embodiments of the present invention will hereinafter be described in detail with reference to the accompanying drawings.

FIG. 1 is a flowchart illustrating a method of designing a rotary thermal actuator according to an embodiment of the present invention.

Referring to FIG. 1, the method includes determining the shape of an entire design domain (operation S100), dividing the entire design domain into domains which are symmetrical to one another in a rotational direction from the center of the entire design (operation S110), designing the domains using a topology optimization method which uses the initial shape of thermal expansion members in the respective domains, material properties of the thermal expansion members, and boundary conditions of the domains (operation S120), and designing the entire domain based on the domains (operation S130).

The method may further include post-processing (operation S140) in order to smoothly connect the results of the above operations.

Specifically, the shape of the entire design domain is determined (operation S100). FIG. 2A illustrates an entire design domain 200 of a square shape according to an embodiment of the present invention. FIG. 2B illustrates an entire design domain 200 of a round shape according to an embodiment of the present invention.

The entire design domain 200 may be square or round. The entire design domain 200 may take various shapes other than the square and round shapes.

Referring to FIGS. 2A and 2B, a driving stage 220 on which a driving object can be placed may be disposed at the center of the entire design domain 200. It may be assumed that the stage is fully filled with materials. Electrodes 210 supplying electric energy to thermal expansion members 230 may be formed on edges of the entire design domain 200. In FIGS. 2A and 2B, 0 V is applied to a pair of edges of a square, which are diagonal to each other, and $V_{apply}$ is applied to the other pair of edges of the square.

In addition, the size of the entire design domain 200 is 800 μm×800 μm. The square driving stage 220 illustrated in FIG. 2A is designed to have a size of 100 μm×100 μm, and the round driving stage 220 illustrated in FIG. 2B is designed to have a diameter of 100 μm. It is obvious to those of ordinary skill in the art that the shape and size of the entire design domain 200 and those of the driving stage 220 can be variously selected. If the entire design domain 200 is round as illustrated in FIG. 2B, the density of a non-design domain outside the round design domain 200 may be fixed to 1 in order to design the entire design domain 200 in the same boundary conditions as the entire design domain 200 illustrated in FIG. 2A.

The entire design domain 200 is divided into the domains which are symmetrical to one another in the rotational direction from the center of the entire design domain 200 (operation S110). FIGS. 3A and 3B illustrate an entire design domain 200 divided into domains which are symmetrical to one another in a rotational direction from the center of the entire design domain 200 according to an embodiment of the present invention. Referring to FIGS. 3A and 3B, if each of the domains is rotated by a predetermined angle (90 degrees (=360/4) since the entire design domain 200 is divided into four domains in FIG. 3) with respect to the center of the entire design domain 200, it overlaps its neighboring domains.

Since it is the rotary thermal actuator that is to be designed, the entire design domain 200 may be divided into domains such that the domains are symmetrical to one another in the rotational direction from the center of the entire design domain 200. In FIG. 3A, the domains into which the entire design domain 200 is divided are square. In FIG. 3B, each of the domains is bent in a '㄂' shape. Although the shape of the domains illustrated in FIG. 3A is different from that of the domains illustrated in FIG. 3B, they are identical in that they are symmetrical to one another in the rotational direction from the center of the entire design domain 200. It is obvious to those of ordinary skill in the art that an entire design domain can be divided into domains, which are symmetrical to one another in a rotational direction from the center of the entire design domain, using various methods other than the method suggested in FIGS. 3A and 3B.

As illustrated in FIGS. 3A and 3B, the entire design domain may be divided into four domains. Then, the entire design domain may be analyzed. However, topology optimization may be performed using only one of the four domains as a design variable.

Next, the domains are designed using the topology optimization method which uses the initial shape of the thermal expansion members 230, the material properties of the thermal expansion members 230, and the boundary conditions (operation S120).

Generally, the initial shape of the thermal expansion members 230 may be designed by defining such that the domains have uniform densities. Alternatively, topology optimization may be performed by giving a random initial shape to the thermal expansion member 230.

FIG. 4 illustrates an intuitively designed rotary thermal actuator according to an embodiment of the present invention.

Referring to FIG. 4, if thermal expansion members 230 are connected to a driving stage 220, the driving stage 220 is intuitively rotated by expansion and contraction of the thermal expansion members 230. Each of the thermal expansion members 230 faces each side of the driving stage 220 instead of the center of the driving stage 220 and is connected to a vertex of the driving stage 220. Therefore, if the thermal expansion members 230 expand, the driving stage 220 is rotated by torque in a clockwise direction. If the thermal expansion members 230 contract, the driving stage 220 is rotated by torque in a counter-clockwise direction. Due to this intuitive design, the thermal expansion members 230 connected to the driving stage 220 may be symmetrical to one another in a rotational direction as illustrated in FIG. 4. In addition, the thermal expansion members 230 may be connected to the driving stage 220 without facing the center of the driving stage 220, so that they can apply torque to the driving stage 220.

The initial shape of the thermal expansion members 230 may be a shape having a smaller width toward the driving stage 220. This can be understood from the shape of the rotary thermal actuator after the topology optimization.

Another end of each of the thermal expansion members 230 connected to the driving stage 220 may be connected to each of electrodes 210 supplying electric energy.

The thermal expansion members 230 may be formed of any material, such as silicon, which can repeat thermal expansion and thermal contraction according to the supply of electric energy.

The material properties of the thermal expansion members 230 represent unique properties of the material of the thermal expansion members 230 using various values. For example, the material properties may include Young's modulus, Poisson's ratio, depth, electrical conductivity, thermal conductivity, convection coefficient, and thermal expansion coefficient.

The displacement of a structure may affect temperature and an electric field, and the temperature of the structure may increase due to thermal energy generated by electric energy. As in a number of experiments and studies, in the present invention, it is assumed that values of the material properties are linear. Based on this assumption, analysis and optimization are performed through a series of analysis of electricity, temperature, and structure.

The boundary conditions of the domains may include an applied voltage to the boundary.

The domains can be designed using the topology optimization method based on the initial shape and material properties of the thermal expansion members 230 and the boundary conditions of the domains described above. In this case, a conventional density method may be used as the topology optimization method. In the conventional density method, the density of a finite element is modeled to have a median density value between 0 and 1, and topology is optimized.

An element connectivity parameterization method may also be used as the topology optimization method. In the case of a multi-physics system problem such as a thermal actuator, it may sometimes be difficult to interpolate to have a physical meaning using the density. If the density method is used to analyze a heat transfer problem, a undershoot may occur. The undershoot refers to a state in which a physically impossible temperature occurs as a result of analysis due to properties related to convection. To solve this problem, the element connectivity parameterization method has been suggested. According to the element connectivity parameterization method, topology optimization of the multi-physics system problem is performed by changing and expressing the stiffness of links that connect all elements instead of keeping the elements' original stiffness. For more information about the element connectivity parameterization method, "The Element Connectivity Parameterization Formulation for the Topology Design Optimization of Multui-physics Systems" posted at Wiley InterScience (www.interscience.wiley.com) on August 11 can be referred to.

Next, the entire design domain 200 is designed by arranging the designed domains to be symmetrical to one another (operation S130). If the entire design domain 200 is divided into four domains, the four domains are identical in terms of their shapes, the initial shape and material properties of the thermal expansion members 230, and the boundary conditions. Therefore, the shapes of the designed domains are all identical. In this regard, after one of the domains is designed, the other domains can be designed to be symmetrical to the design result of the domain.

After the entire design domain 200 is designed as described above, post-processing may further be performed in order to more smoothly connect the results of topology optimization (operation S40). This operation is required since the results of topology optimization must be appropriately post-processed and thus smoothly connected to one another in order to actually manufacture a designed actuator.

Figure 5A:
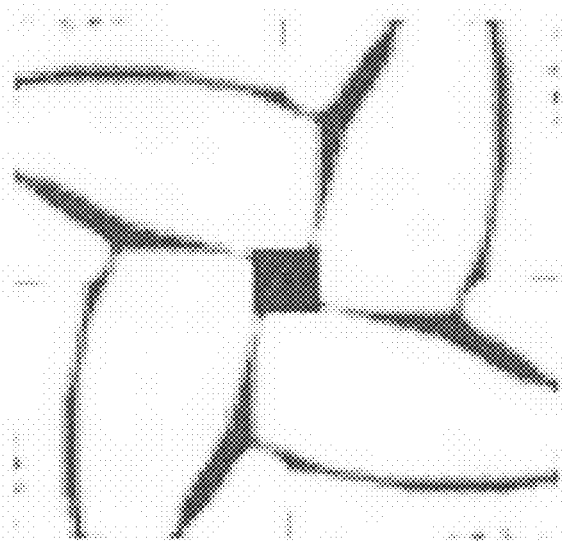
FIGS. 5A through 5C illustrate the density distribution, temperature distribution, and post-processing result of a rotary thermal actuator having an entire domain divided into four domains, an initial shape defined such that the four domains have uniform densities, and on which topology optimization is performed according to an embodiment of the present invention.
Figure 5B:
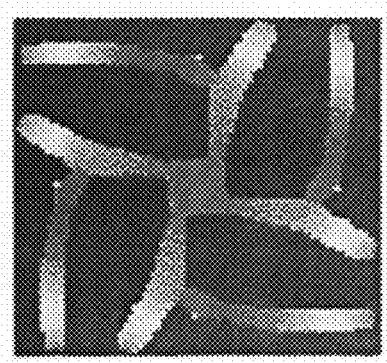
Figure 6A:
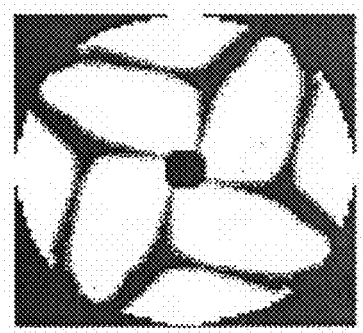
Figure 6B:
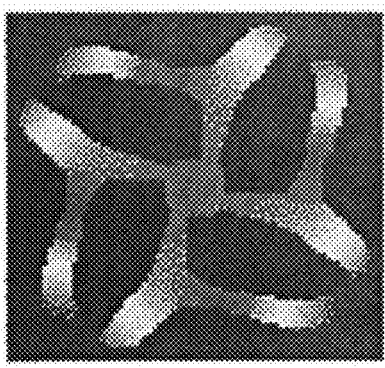
Figure 5C:
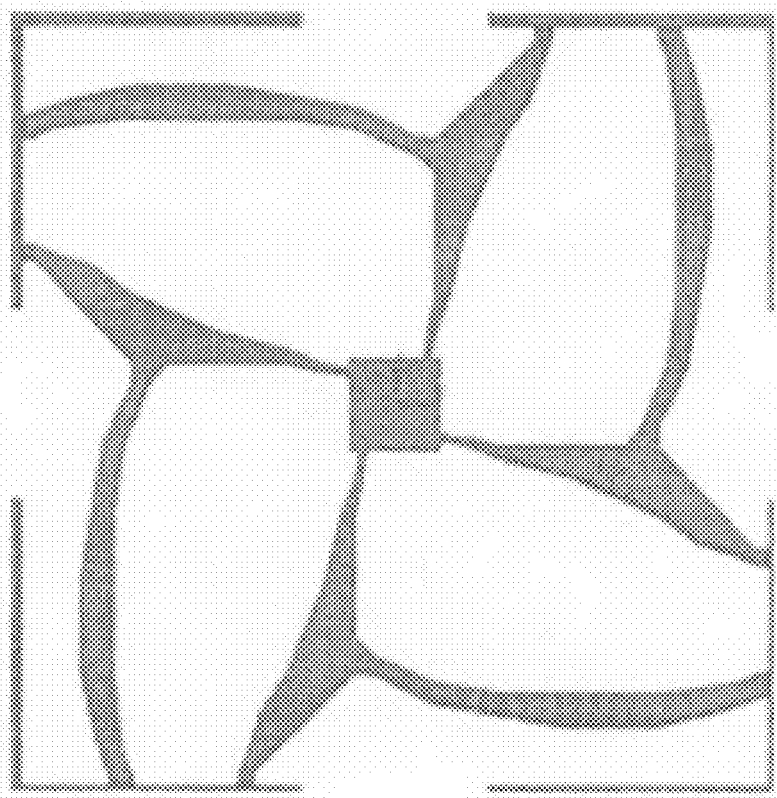

FIGS. 5A through 5C illustrate the density distribution, temperature distribution, and post-processing result of a rotary thermal actuator having an entire domain divided into four domains, an initial shape of thermal expansion members 230 defined such that the four domains have uniform densities, and on which topology optimization is performed according to an embodiment of the present invention. FIGS. 6A through 6C illustrate the density distribution, temperature distribution, and post-processing result of a rotary thermal actuator having a round entire design domain unlike the entire design domain illustrated in FIG. 5 and on which topology optimization is performed according to an embodiment of the present invention. FIGS. 7A through 7C illustrate the density distribution, temperature distribution, and post-processing result of a rotary thermal actuator having an entire design domain divided into four domains as illustrated in FIG. 3B, an initial shape of thermal expansion members 230 identical to the initial shape illustrated in FIG. 5A, and on which topology optimization is performed according to an embodiment of the present invention.

The results of topology optimization illustrated in FIGS. 5 through 7 are all based on the assumption that the size of the entire design domain is 800 μm×800 μm, material (silicon) properties are as shown in Table 1, and an applied voltage is 6 V.

TABLE 1

| Material Properties | Value |
| --- | --- |
| Young's modulus | 165.7 GPa |
| Poisson's ratio | 0.22 |
| Depth | 20 μm |
| Electrical conductivity | $2.00 \times 10^4$ K/Ωm |
| Thermal conductivity | 150 W/Km |
| Convection coefficient | $\bar{h} = 9.35 \times 10^3$ W/m$^2$K |
| Thermal expansion coefficient | $2.60 \times 10^{-6}$ K$^{-1}$ |

Referring to the results of FIGS. 5A through 5C, four thermal expansion members 230 are connected to a driving stage 220 in a tangential direction without facing the center of the driving stage 220 so that they can apply torque to the driving stage 220. In addition, a portion of each of the thermal expansion members 230, which is connected to the driving stage 220, becomes thinner toward the driving stage 220. Each of the thermal expansion members 230 which connect the driving stage 220 and one of electrodes 210 is disengaged in the middle and is connected to another neighboring one of the electrodes 210. Although the shapes of the rotary thermal actuators on which topology optimization was performed are different from each other, they are similar on the whole.

When a driving voltage was 6 V, the rotary thermal actuators of FIGS. 5 through 7 were analyzed using ANSYS. The analysis results of the rotary thermal actuators of FIGS. 5 through 7 show rotational displacements of 1.1 degrees, 0.9 degrees, and 1.2 degrees, respectively.

Figure 8A:
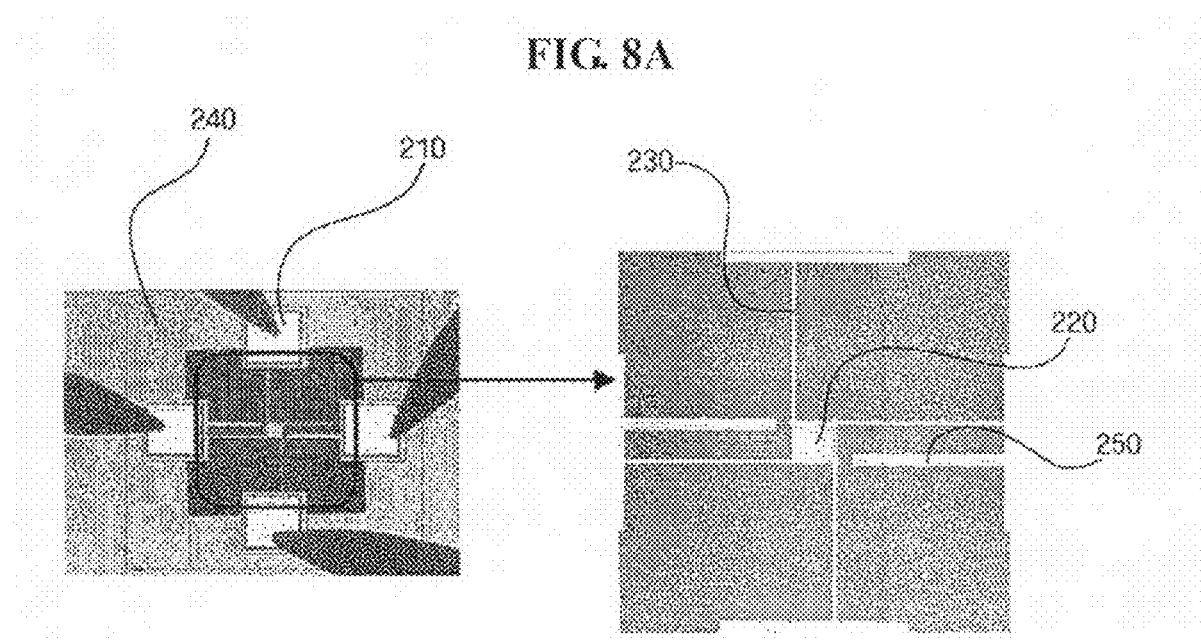
FIG. 8A illustrates an actuator intuitively designed and manufactured.
Figure 8B:
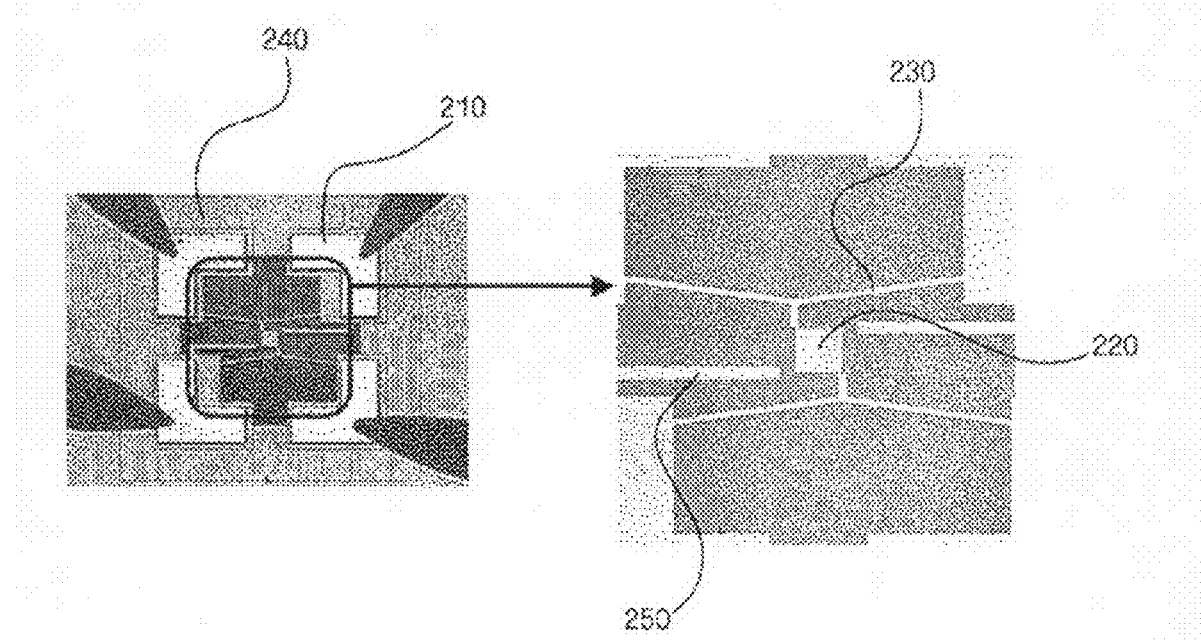
FIG. 8B illustrates a conventional actuator manufactured by combining two actuators making to-and-fro motions and widely used as micro-electromechanical system (MEMS) thermal actuators.
Figure 8C:
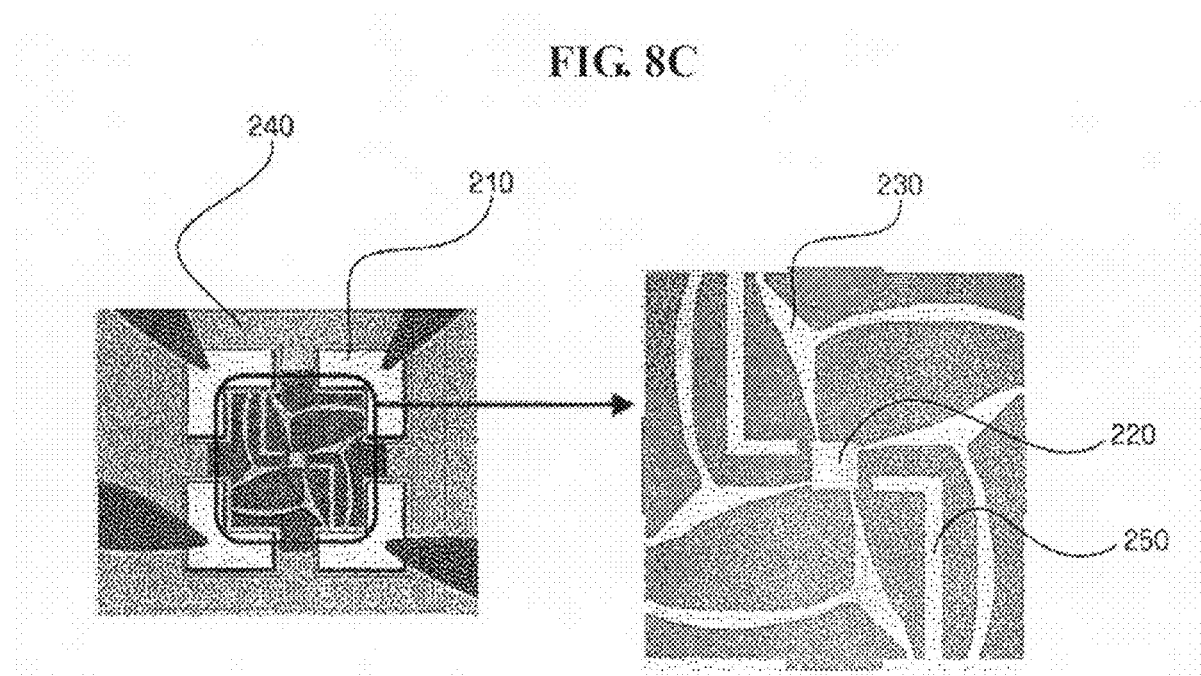
FIG. 8C illustrates an actuator manufactured as illustrated in FIG. 5 according to an embodiment of the present invention.
Figure 8D:
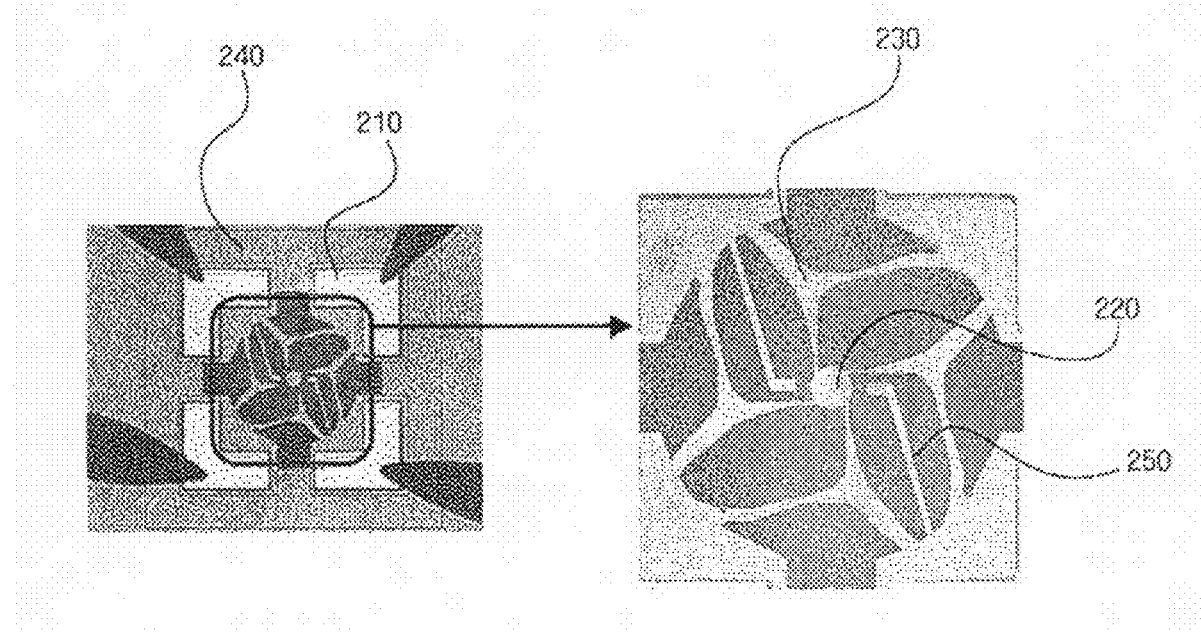
FIG. 8D illustrates an actuator manufactured as illustrated in FIG. 6 according to an embodiment of the present invention.
Figure 8E:
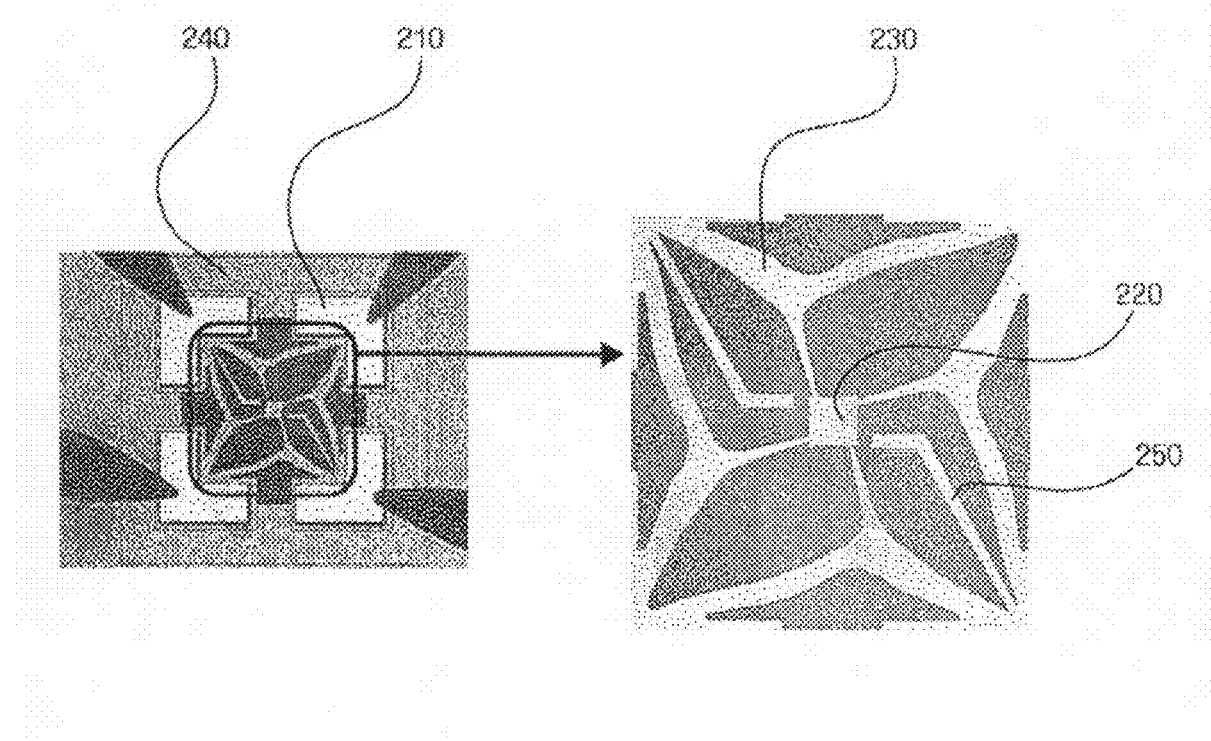
FIG. 8E illustrates an actuator manufactured as illustrated in FIG. 7 according to an embodiment of the present invention.

The performance of rotary thermal actuators manufactured according to the present method will now be compared. FIG. 8A illustrates an actuator intuitively designed and manufactured. FIG. 8B illustrates a conventional actuator manufactured by combining two actuators making to-and-fro motions and widely used as MEMS thermal actuators. FIG. 8C illustrates an actuator manufactured as illustrated in FIG. 5 according to an embodiment of the present invention. FIG. 8D illustrates an actuator manufactured as illustrated in FIG. 6 according to an embodiment of the present invention. FIG. 8E illustrates an actuator manufactured as illustrated in FIG. 7 according to an embodiment of the present invention.

As described above, FIG. 8A illustrates an actuator designed and manufactured to intuitively operate using thermal expansion. FIG. 8B illustrates an actuator manufactured by combining two actuators, which make to-and-fro motions in a horizontal direction and are widely used as MEMS thermal actuators, and thus obtaining rotational displacement.

Each of the actuators illustrated in FIGS. 8A through 8E includes a substrate 240 at the center thereof, a driving stage 220 at the center of the substrate 240, electrodes 210 disposed at the edges of the substrate 240, and thermal expansion members (silicon) 230 connecting the electrodes 210 to the driving stage 220. A portion 250 (extending from each of the electrodes 210 toward the driving stage 220 in each of FIGS. 8A through 8E), which is shown in addition to the result of topology optimization, is a gage for measuring rotational displacement. The voltages of the electrodes 210 are all 6 V.

Twenty samples of each actuator were manufactured using two wafers, and experiments were carried out using the samples. The calculation results of the mean and standard deviation of rotation angles in each case are shown in Table 2.

TABLE 2

| Actuator | Average Rotation Angle (±Standard Deviation) | Rate |
| --- | --- | --- |
| FIG. 8A | 0.61(±0.037) | 97% |
| FIG. 8B | 0.63(±0.081) | 100% |
| FIG. 8C | 1.57(±0.070) | 249% |
| FIG. 8D | 1.45(±0.108) | 230% |
| FIG. 8E | 1.67(±0.123) | 265% |

Referring to Table 2, the performances of the actuators (FIGS. 8C through 8E) designed using the topology optimization method according to the present invention are approximately 2.5 times better than that of the actuator (FIG. 8A) intuitively designed and that of the actuator (FIG. 8B) designed by combining conventional linear actuators.

A rotary thermal actuator according to an embodiment of the present invention includes thermal expansion members 230 thermally expanded by heat energy, energy sources 210 supplying energy to the thermal expansion members 230, and a driving stage 220 rotated by thermal expansion of the thermal expansion members 230. The shape of the thermal expansion members 230 may be designed using the method of designing the rotary thermal actuator described above.

The energy sources 210 may be electrodes supplying electric energy.

The configuration of the rotary thermal actuator and properties of each configuration have been described above in relation to the method of designing the rotary thermal actuator, and thus a detailed description thereof will be omitted.

As described above, a method of designing a rotary thermal actuator and a rotary thermal actuator according to the present invention provide at least one of the following advantages.

First, a thermal actuator having a superior rotation performance in a MEMS structure can be manufactured.

Second, a rotary thermal actuator has relatively strong force when driven at a low voltage.

Third, since the rotary thermal actuator is as easy to manufacture as an electrostatic actuator and has strong force, it can replace the electrostatic actuator.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. A method of designing a rotary thermal actuator, the method comprising:
    (a) setting the shape of an entire design domain;
    (b) dividing the entire design domain into a predetermined number of domains which are symmetrical to one another in a rotational direction from the center of the entire design domain;
    (c) designing the domains using a topology optimization method which uses a driving stage disposed at the center of the entire design domain, an initial shape of thermal expansion members which connect electrodes disposed at outer boundaries of the entire design domain, material properties of the thermal expansion members, and boundary conditions of the domains; and
    (d) designing the entire design domain such that the designed domains are symmetrical to one another in the rotational direction.

2. The method of claim 1, wherein the entire design domain is square.

3. The method of claim 1, wherein the entire design domain is round.

4. The method of claim 1, wherein the entire design domain is divided into four domains.

5. The method of claim 1, wherein the thermal expansion members are silicon.

6. The method of claim 1, wherein the initial shape of the thermal expansion members is a shape having a smaller width toward the driving stage.

7. The method of claim 1, wherein the boundary conditions comprise voltage.

8. The method of claim 1, wherein the topology optimization method comprises an element connectivity parameterization method.

9. The method of claim 1, further comprising (e) performing post-processing in order to smoothly connect the design results.

10. A rotary thermal actuator comprising:
    thermal expansion members thermally expanded by thermal energy;
    energy sources supplying energy to the thermal expansion members; and
    a driving stage connected to the thermal expansion members and rotated by thermal expansion of the thermal expansion members,
    wherein the shape of the thermal expansion members are designed using the method of any one of claims 1 through 9.

11. The actuator of claim 10, wherein the energy sources are electrodes supplying electric energy.

* * * * *